US012595345B2

(12) United States Patent
Okano

(10) Patent No.: US 12,595,345 B2
(45) Date of Patent: Apr. 7, 2026

(54) GAS BARRIER LAMINATE, COATING LIQUID FOR PRODUCING THE GAS BARRIER LAMINATE, PACKAGING MATERIAL, PACKAGING BODY, AND PACKAGED ARTICLE

(71) Applicant: TOPPAN INC., Tokyo (JP)

(72) Inventor: Tetsuya Okano, Tokyo (JP)

(73) Assignee: TOPPAN INC., Tokyo (JP)

( * ) Notice: Subject to any disclaimer, the term of this patent is extended or adjusted under 35 U.S.C. 154(b) by 834 days.

(21) Appl. No.: 17/872,195

(22) Filed: Jul. 25, 2022

(65) Prior Publication Data

US 2022/0363853 A1 Nov. 17, 2022

Related U.S. Application Data

(63) Continuation of application No. PCT/JP2021/002639, filed on Jan. 26, 2021.

(30) Foreign Application Priority Data

Jan. 27, 2020 (JP) ................................. 2020-010828

(51) Int. Cl.

| | |
|---|---|
| C08J 7/04 | (2020.01) |
| B32B 27/30 | (2006.01) |
| B65D 65/40 | (2006.01) |
| C08F 20/06 | (2006.01) |
| C08J 7/048 | (2020.01) |
| C08K 3/22 | (2006.01) |
| C09D 5/00 | (2006.01) |
| C09D 7/61 | (2018.01) |
| C09D 7/63 | (2018.01) |
| C09D 133/02 | (2006.01) |
| C09D 201/08 | (2006.01) |

(52) U.S. Cl.
CPC ............. *C08J 7/0423* (2020.01); *B32B 27/30* (2013.01); *B65D 65/40* (2013.01); *C08F 20/06* (2013.01); *C08J 7/0427* (2020.01); *C08J 7/048* (2020.01); *C09D 5/00* (2013.01); *C09D 7/61* (2018.01); *C09D 7/63* (2018.01); *C09D 133/02* (2013.01); *C09D 201/08* (2013.01); *C08J 2367/02* (2013.01); *C08J 2433/02* (2013.01); *C08K 2003/2296* (2013.01)

(58) Field of Classification Search
CPC ........ C08J 7/0423; C08J 7/048; C08J 7/0427; C08J 2367/02; C08J 2433/02; C08K 2003/2296; C08F 20/06; C09D 5/00; C09D 201/08; C09D 7/61; C09D 7/63; C09D 133/02; B32B 27/30; B65D 65/40
See application file for complete search history.

(56) References Cited

U.S. PATENT DOCUMENTS

| | | | |
|---|---|---|---|
| 2005/0131162 A1 | 6/2005 | Tanaka et al. | |
| 2007/0111005 A1 | 5/2007 | Oshita et al. | |

FOREIGN PATENT DOCUMENTS

| | | | | |
|---|---|---|---|---|
| CA | 2101037 A1 | 1/1994 | | |
| EP | 2 014 730 A1 | 1/2009 | | |
| EP | 4 137 318 A1 | 2/2023 | | |
| EP | 4 169 849 A1 | 4/2023 | | |
| JP | 06-093133 A | 4/1994 | | |
| JP | 2000-080396 A | 3/2000 | | |
| JP | 2000-289154 A | 10/2000 | | |
| JP | 2000-336195 A | 12/2000 | | |
| JP | 2001-323204 A | 11/2001 | | |
| JP | 2002-020677 A | 1/2002 | | |
| JP | 2002-241671 A | 8/2002 | | |
| JP | 2005-126528 A | 5/2005 | | |
| JP | 4620945 B2 | 1/2011 | | |
| WO | WO-9829487 A1 * | 7/1998 | ............. | A61K 47/32 |
| WO | WO-03/091317 A1 | 11/2003 | | |
| WO | WO-2005/053954 A1 | 6/2005 | | |
| WO | WO-2016/093208 A1 | 6/2016 | | |
| WO | WO-2022/154031 A1 | 7/2022 | | |

OTHER PUBLICATIONS

Das et al., "A Kinetic Investigation of the Flocculation of Alumina with Polyacrylic Acid", Journal of Colloid and Interface Science, 271, Elsevier Inc., 2004, doi:10.1016/j.jcis.2003.11.010, pp. 102-109.*
Tseng et al., "Effect of Molecular Weight of Poly(acrylic acid) on the Interaction of Oppositely Charged Ionic Surfactant-Polyelectrolyte Mixtures", Journal of the Taiwan Institute of Chemical Engineers, 92, Elsevier B.V., 2018, https://doi.org/10.1016/j.jtice.2018.02.030, pp. 50-57.*
Machine English translation of JP 2005-126528, Inaba et al., May 19, 2005.*
Odian, George, Principles of Polymerization, John Wiley & Sons, Inc., 1991, pp. 19-24.*
Extended European Search Report issued in connection with EP Appl. Ser. No. 21747402.2 dated Jun. 28, 2023.
International Searching Authority, "International Search Report," issued in connection with International Patent Application No. PCT/JP2021/002639, dated Apr. 6, 2021, 5 pages.
International Searching Authority, "Written Opinion," issued in connection with International Patent Application No. PCT/002639, dated Apr. 6, 2021, 4 pages.

* cited by examiner

*Primary Examiner* — Patrick D Niland
(74) *Attorney, Agent, or Firm* — Foley & Lardner LLP

(57) ABSTRACT

High gas barrier properties can be achieved without requiring strict control for preventing entry of moisture. A coating liquid for producing a gas barrier laminate contains a carboxy group-containing polymer, polyvalent metal-containing particles, a surfactant, and an organic solvent. In the coating liquid, the carboxy group-containing polymer has a number average molecular weight of 100,000 or less.

16 Claims, No Drawings

GAS BARRIER LAMINATE, COATING LIQUID FOR PRODUCING THE GAS BARRIER LAMINATE, PACKAGING MATERIAL, PACKAGING BODY, AND PACKAGED ARTICLE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/002639, filed on Jan. 26, 2021, which in turn claims the benefit of JP 2020-0010828, filed Jan. 27, 2020 the disclosures of all which are incorporated herein by reference in its entirety.

TECHNICAL FIELD

The present invention relates to gas barrier laminates.

BACKGROUND

If articles, such as foods, drugs, cosmetics, agrichemicals, and industrial products, are stored for a significant period of time, their qualities may be deteriorated due to oxygen. Therefore, films or sheets having oxygen gas barrier properties have been used as packaging materials for these articles.

As such packaging materials, materials including an aluminum foil as a gas barrier layer have been frequently used. However, if packaging materials including an aluminum foil are used, the contents cannot be seen and metal detectors cannot be used. Therefore, development of packaging materials having good gas barrier properties and transparency has been sought in the fields of foods and pharmaceuticals in particular.

In order to meet this trend, there have been used gas barrier laminates including a substrate on which a polyvinylidene chloride (PVDC) layer is provided by applying a coating liquid containing PVDC thereto. Layers made of PVDC are transparent and have gas barrier properties.

However, PVDC may generate dioxins during incineration. Therefore, there is a need to shift from PVDC to non-chlorine materials. In order to meet this need, for example, use of polyvinyl alcohol (PVA) polymers in place of PVDC has been proposed.

Layers made of PVA polymers become highly dense due to hydrogen bonding of the hydroxyl group, and exhibit high gas barrier properties in low humidity atmospheres. However, layers made of PVA polymers suffer from significant deterioration in gas barrier properties in high humidity atmospheres due to absorbing moisture and thereby loosening the hydrogen bonding. For this reason, gas barrier laminates using layers of PVA polymers as gas barrier layers cannot be used in many cases as packaging materials for foods and the like containing a large amount of moisture, and therefore, use of these laminates has been limited to packaging materials and the like for dry substances.

For the purpose of further improving gas barrier properties, it has been proposed to add an inorganic lamellar compound to PVA polymers (see PTL 1). However, since addition of an inorganic lamellar compound does not necessarily improve water resistance of PVA polymers, the issue of deteriorating gas barrier properties in high humidity atmospheres still remains.

In order to improve gas barrier properties in high humidity atmospheres, there has been proposed a method of producing a gas barrier laminate by applying a coating liquid, which contains a PVA polymer and a polymer that can form a cross-linked structure with the PVA polymer, onto a substrate and heat treating the coated substrate (PTLs 2 to 6).

However, in order to achieve sufficiently high gas barrier properties with these techniques, heat treatment after application of the coating liquid is required to be performed at a high temperature, e.g., 150° C. or higher, to form a cross-linked structure. Depending on the material of the substrate or, for example, if the material of the substrate is a polyolefin, such as polypropylene (OPP) or polyethylene (PE), such heat treatment may significantly damage the substrate. Therefore, there is a need for gas barrier laminates which can be produced under milder conditions.

As a method of forming a gas barrier layer, there has also been proposed a method including forming a layer containing a polycarboxylic acid polymer, such as a polymer of a polyacrylic acid, and ion-crosslinking the polycarboxylic acid polymer with polyvalent metal ions (see PTLs 7 to 8).

This method does not require high temperature heat treatment as in the methods described in PTLs 2 to 6. Therefore, polyolefins can be used for substrates. Furthermore, the obtained gas barrier layers have high gas barrier properties even in high humidity atmospheres. Therefore, gas barrier laminates including such gas barrier layers can be applied to usages in which heat sterilization treatment, such as boiling or retorting, is performed.

However, if a polycarboxylic acid polymer and a polyvalent metal compound are mixed into a coating liquid together, they may react with each other in the coating liquid and may easily form a precipitate. If a precipitate is formed in the liquid, a uniform film cannot be formed. Therefore, when forming a gas barrier layer using this method, a layer containing a polycarboxylic acid polymer and a layer containing a polyvalent metal compound are formed separately, or an aqueous solution of polyvalent metal salt is brought into contact with a layer containing a polycarboxylic acid polymer. Therefore, this method raises an issue of requiring a greater number of steps.

There has been another proposal in which the water content is reduced to 1,000 ppm or less in a coating liquid containing a polycarboxylic acid polymer, polyvalent metal compound particles, a surfactant, and an organic solvent (see PTL 9). This coating liquid, in which the water content is 1,000 ppm or less, can reduce reaction between a polycarboxylic acid polymer and a polyvalent metal compound.

[Citation List] [Patent Literature] PTL 1: JP H6-093133 A; PTL 2: JP 2000-289154 A; PTL 3: JP 2000-336195 A; PTL 4: JP 2001-323204 A; PTL 5: JP 2002-020677 A; PTL 6: JP 2002-241671 A; PTL 7: WO2003/091317 A; PTL 8: WO2005/053954 A; PTL 9: JP 2005-126528 A.

SUMMARY OF THE INVENTION

The coating liquid described in PTL 9 requires strict control for preventing entry of moisture into the liquid so that the polycarboxylic acid polymer does not react with the polyvalent metal compound during production, storage, and use.

The present invention aims to achieve high gas barrier properties without requiring strict control for preventing entry of moisture.

According to a first aspect of the present invention, there is provided a coating liquid for producing a gas barrier laminate containing a carboxy group-containing polymer (A), polyvalent metal-containing particles (B), a surfactant (C), and an organic solvent (D), wherein the number average molecular weight of the carboxy group-containing polymer (A) is 100,000 or less.

According to a second aspect of the present invention, there is provided the coating liquid according to the first aspect, wherein the number average molecular weight of the carboxy group-containing polymer (A) is 2,000 or more.

According to a third aspect of the present invention, there is provided the coating liquid according to the first or second aspect, wherein the water content in terms of mass fraction is 50,000 ppm or less.

According to a fourth aspect of the present invention, there is provided the coating liquid according to any of the first to third aspects, wherein the ratio of a product (Bt) of the mole number and the valence of polyvalent metal contained in the polyvalent metal-containing particles (B), to a mole number (At) of carboxy groups contained in the carboxy group-containing polymer (A) is 0.6 or more.

According to a fifth aspect of the present invention, there is provided the coating liquid according to any of the first to fourth aspects, wherein the carboxy group-containing polymer (A) is a homopolymer of a carboxy group-containing unsaturated monomer, a copolymer of two or more carboxy group-containing unsaturated monomers, a copolymer of a carboxy group-containing unsaturated monomer and other polymerizable monomers, a carboxy group-containing polysaccharide, or a mixture of two or more of these materials.

According to a sixth aspect of the present invention, there is provided the coating liquid according to any of the first to fifth aspects, wherein the carboxy group-containing unsaturated monomer forming the carboxy group-containing polymer (A) is at least one $\alpha,\beta$-monoethylenically unsaturated carboxylic acid selected from a group consisting of acrylic acid, methacrylic acid, crotonic acid, itaconic acid, maleic acid, and fumaric acid.

According to a seventh aspect of the present invention, there is provided the coating liquid according to any of the first to sixth aspects, wherein the polyvalent metal-containing particles (B) have an average particle size in the range of 10 nm to 10 μm.

According to an eighth aspect of the present invention, there is provided the coating liquid according to any of the first to seventh aspects, wherein the polyvalent metal of the polyvalent metal-containing particles (B) is a bivalent metal.

According to a ninth aspect of the present invention, there is provided a method of producing a gas barrier laminate including forming a coating layer using the coating liquid according to any of the first to eighth aspects.

According to a tenth aspect of the present invention, there is provided a gas barrier laminate obtained using the production method according to the ninth aspect.

According to an eleventh aspect of the present invention, there is provided the gas barrier laminate according to the tenth aspect, wherein the laminate has a thickness in the range of 0.01 μm to 100 μm and an oxygen permeability of 1,000 cm³/(m²·day·MPa) or less measured under conditions of 30° C. and a relative humidity of 70%.

According to a twelfth aspect of the present invention, there is provided a packaging material including the gas barrier laminate according to the tenth or eleventh aspect.

According to a thirteenth aspect of the present invention, there is provided a packaging body containing the packaging material according to the twelfth aspect.

According to a fourteenth aspect of the present invention, there is provided a packaged article including the packaging body according to the thirteenth aspect and contents accommodated in the packaging body.

According to the present invention, high gas barrier properties can be achieved without requiring strict control for preventing entry of moisture.

DETAILED DESCRIPTION

Embodiments of the present invention will be described below with reference to the drawings. Further, the embodiments described below are merely examples of configurations for embodying the technical idea of the present invention. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Coating Liquid for Producing Gas Barrier Laminate

A coating liquid for producing a gas barrier laminate according to an embodiment of the present invention (also simply termed coating liquid hereinafter) is characterized in that it contains a carboxy group-containing polymer (A), polyvalent metal-containing particles (B), a surfactant (C), and an organic solvent (D), and that the carboxy group-containing polymer (A) has a number average molecular weight of 100,000 or less.

Carboxy Group-Containing Polymer (A)

The carboxy group-containing polymer used in the coating liquid is a polymer having two or more carboxy groups per molecule and may be referred to as a polycarboxylic acid polymer. The carboxy group-containing polymer may typically be a homopolymer of a carboxy group-containing unsaturated monomer, copolymer of two or more carboxy group-containing unsaturated monomers, copolymer of a carboxy group-containing unsaturated monomer and other polymerizable monomers, or polysaccharide having carboxy groups per molecule (also termed carboxy group-containing polysaccharide or acidic polysaccharide).

The carboxy groups include not only free carboxy groups, but also acid anhydride groups (specifically, dicarboxylic anhydride groups). In the acid anhydride groups, the rings may be partially open to form carboxy groups. Part of the carboxy groups may be neutralized with alkali. In this case, the degree of neutralization is preferred to be 20% or less.

The degree of neutralization is a value obtained through the following method. Specifically, the carboxy groups can be partially neutralized by adding an alkali (E) to the carboxy-group containing polymer (A). In this case, the degree of neutralization is the ratio of the mole number (Et) of the alkali (E) to the mole number (At) of the carboxy groups contained in the carboxy-group containing polymer (A).

Furthermore, a graft polymer obtained by graft polymerizing a carboxy-group containing unsaturated monomer with a polymer, such as a polyolefin, containing no carboxy groups can also be used as a carboxy-containing polymer. Also, a polymer obtained by hydrolyzing a polymer having hydrolyzable ester groups, such as alkoxycarbonyl groups (e.g., methoxycarbonyl groups), and converting the ester groups into carboxy groups can be used.

The carboxy group-containing unsaturated monomer is preferred to be $\alpha,\beta$-monoethylenically unsaturated carboxylic acid Accordingly, the carboxy group-containing polymer includes a homopolymer of $\alpha,\beta$-monoethylenically unsaturated carboxylic acid, copolymer of two or more $\alpha,\beta$-monoethylenically unsaturated carboxylic acids, and copolymer of $\alpha,\beta$-monoethylenically unsaturated carboxylic acid and other polymerizable monomers. Other polymerizable monomers may typically be ethylenically unsaturated monomers.

Examples of the $\alpha,\beta$-monoethylenically unsaturated carboxylic acid may include unsaturated monocarboxylic acids such as acrylic acid, methacrylic acid, and crotonic acid; unsaturated dicarboxylic acids such as maleic acid, fumaric acid, and itaconic acid; unsaturated dicarboxylic acid anhydrides such as maleic anhydride and itaconic anhydride; and mixtures of two or more of these materials. Of these materials, at least one $\alpha,\beta$-monoethylenically unsaturated carboxylic acid selected from the group consisting of acrylic acid, methacrylic acid, crotonic acid, maleic acid, fumaric acid, and itaconic acid is preferred, and at least one $\alpha,\beta$-monoethylenically unsaturated carboxylic acid selected from the group consisting of acrylic acid, methacrylic acid, and maleic acid is more preferred.

Examples of other polymerizable monomers, or ethylenically unsaturated monomers in particular, that can be copolymerized with $\alpha,\beta$-monoethylenically unsaturated carboxylic acid may include ethylene; $\alpha$-olefins such as propylene, 1-butene, 1-pentene, 1-hexene, and 1-octene; saturated carboxylic acid vinyl esters such as vinyl acetate; acrylic acid alkyl esters such as methyl acrylate and ethyl acrylate; methacrylic acid alkyl esters such as methyl methacrylate and ethyl methacrylate; chlorine-containing vinyl monomers such as vinyl chloride and vinylidene chloride; fluorine-containing vinyl monomers such as vinyl fluoride and vinylidene fluoride; unsaturated nitriles such as acrylonitrile and methacrylonitrile; aromatic vinyl monomers such as styrene and $\alpha$-methylstyrene; and itaconic acid alkyl esters. These ethylenically unsaturated monomers can be used singly or in combination of two or more. If the carboxy group-containing polymer is a copolymer of $\alpha,\beta$-monoethylenically unsaturated carboxylic acid and a saturated carboxylic acid vinyl ester such as vinyl acetate, this copolymer may be used after being saponified to convert the saturated carboxylic acid vinyl ester units into vinyl alcohol units.

Examples of the carboxy group-containing polysaccharide may include acidic polysaccharides having carboxy groups per molecule, such as alginic acid, carboxymethyl cellulose, and pectin. These acidic polysaccharides can be used singly or in combination of two or more. Furthermore, these acidic polysaccharides can be used in combination with a (co)polymer of $\alpha,\beta$-monoethylenically unsaturated carboxylic acid.

If the carboxy group-containing polymer is a copolymer of $\alpha,\beta$-monoethylenically unsaturated carboxylic acid and other ethylenically unsaturated monomers, the ratio of the mole number of the $\alpha,\beta$-monoethylenically unsaturated carboxylic acid monomer to the total mole number of the monomers in the copolymer is preferred to be 60 mol % or more, more preferred to be 80 mol % or more, and even more preferred to be 90 mol % or more, from the perspective of gas barrier properties, hot water resistance, and water vapor resistance of the film to be obtained.

The carboxy group-containing polymer is preferred to be a homopolymer or a copolymer obtained by polymerizing only $\alpha,\beta$-monoethylenically unsaturated carboxylic acid, because such a homopolymer or a copolymer can easily provide a film having good gas barrier properties, moisture resistance, water resistance, hot water resistance, and water vapor resistance, and exhibiting good gas barrier properties even under high humidity conditions. If the carboxy group-containing polymer is a (co)polymer of only $\alpha,\beta$-monoethylenically unsaturated carboxylic acid, a preferred specific example thereof may be a homopolymer or a copolymer obtained by polymerizing at least one $\alpha,\beta$-monoethylenically unsaturated carboxylic acid selected from the group consisting of acrylic acid, methacrylic acid, crotonic acid, maleic acid, fumaric acid, and itaconic acid, or a mixture of two or more of these materials. Of these, a homopolymer or a copolymer of at least one $\alpha,\beta$-monoethylenically unsaturated carboxylic acid selected from the group consisting of acrylic acid, methacrylic acid, and maleic acid is more preferred.

As the carboxy group-containing polymer, polyacrylic acid, polymethacrylic acid, polymaleic acid, or a mixture of two or more of these materials is particularly preferred to be used. The acidic saccharide is preferred to be alginic acid. Of these, polyacrylic acid is particularly preferred from the perspective of being comparatively easily available and easily providing a film having good physical properties.

The carboxy group-containing polymer is taken to have a number average molecular weight of 100,000 or less. This number average molecular weight is preferred to be 90,000 or less, more preferred to be 80,000 or less, even more preferred to be 70,000 or less, still more preferred to be 60,000 or less, and most preferred to be 50,000 or less.

If the number average molecular weight is excessively high, the carboxy group-containing polymer may act as a flocculant. Consequently, the coating liquid may entirely turn into a gel, or a precipitate may be produced in the coating liquid. The coating liquid, in which a gel or a precipitate has been produced, cannot be used for forming a coating film, or if it can be used for forming a coating film, it will be significantly difficult to form a coating film having a uniform thickness and composition. Thus, the coating layer obtained from a coating film with a non-uniform thickness and composition will also have a non-uniform thickness and composition, and will accordingly have insufficient in-plane uniformity such as in gas barrier properties or physical properties.

The number average molecular weight of the carboxy group-containing polymer is preferred to be 2,000 or more, more preferred to be 3,000 or more, even more preferred to be 4,000 or more, and most preferred to be 5,000 or more.

If the number average molecular weight of the carboxy group-containing polymer is excessively small, viscosity of the coating liquid may be reduced. Consequently, convection (Marangoni convection) may occur in the coating liquid in the drying process during coating, and there will be significant difficulty in forming a coating film with a uniform thickness and composition. Consequently, the coating layer to be obtained may have insufficient in-plane uniformity, and it will be difficult to obtain stable gas barrier properties or physical properties. Furthermore, if the number average molecular weight of the carboxy group-containing polymer is excessively small, the breaking stress of the coating film formed from the coating liquid may be reduced and there is a high probability of causing cracking in the coating film when it is processed. It will be significantly difficult for the coating film suffering from cracking to exhibit desired gas barrier properties or physical properties.

The number average molecular weight is a value obtained through measurements based on gel permeation chromatography (GPC). In GPC measurements, in general, the number average molecular weight of a polymer is measured using a standard polystyrene conversion.

Polyvalent Metal-Containing Particles (B)

The polyvalent metal-containing particles used in the above coating liquid are particles containing one or more types of polyvalent metal with a metal ion valence of two or more. The polyvalent metal-containing particles may be particles of polyvalent metal with a metal ion valence of two or more, or may be particles of a compound of polyvalent metal with a metal ion valence of two or more, or may be particles in which these types of particles are mixed.

Specific examples of the polyvalent metal may include, but are not limited to, metals of Group 2A of the short-period periodic table such as beryllium, magnesium, and calcium; transition metals such as titanium, zirconium, chromium, manganese, iron, cobalt, nickel, copper, and zinc; and aluminum.

The polyvalent metal is preferred to be bivalent metal. Also, the polyvalent metal is preferred to form a compound.

Specific examples of the polyvalent metal compound may include, but are not limited to, polyvalent metal oxides, polyvalent metal hydroxides, and polyvalent metal carbonates, and organic or inorganic acid salts of polyvalent metals. Examples of the organic acid salt may include, but are not limited to, acetates, oxalates, citrates, lactates, phosphates, phosphites, hypophosphites, stearates, and monoethylenically unsaturated carboxylates. Examples of the inorganic acid salt may include, but are not limited to, chlorides, sulfates, and nitrates. Alkyl alkoxides of polyvalent metals may also be used as the polyvalent metal compounds. These polyvalent metal compounds can be used singly or in combination of two or more.

Of these polyvalent metal compounds, a compound such as of beryllium, magnesium, calcium, copper, cobalt, nickel, zinc, aluminum, or zirconium is preferred, and a bivalent metal compound such as of beryllium, magnesium, calcium, copper, zinc, cobalt, or nickel is more preferred, from the perspective of dispersion stability of the coating liquid and gas barrier properties of the laminate formed from the coating liquid.

Examples of the preferred bivalent metal compound may include, but are not limited to, oxides such as zinc oxide, magnesium oxide, copper oxide, nickel oxide, and cobalt oxide; carbonates such as calcium carbonate; organic acid salts such as calcium lactate, zinc lactate, and calcium acrylate; and alkoxides such as magnesium methoxide.

The polyvalent metal or polyvalent metal compound is used in the form of particles and the particle shape is maintained in the coating liquid. The polyvalent metal-containing particles in the coating liquid are preferred to have an average particle size in the range of 10 nm to 10 μm (or 10,000 nm), more preferred to be in the range of 12 nm to 1 μm (or 1,000 nm), even more preferred to be in the range of 15 nm to 500 nm, and most preferred to be in the range of 15 nm to 50 nm, from the perspective of dispersion stability of the coating liquid and gas barrier properties of the laminate formed from the coating liquid.

If the average particle size of the polyvalent metal-containing particles in the coating liquid is excessively large, the coating layer to be obtained may tend to be insufficient in thickness uniformity, surface flatness, and ion cross-linking reactivity with the carboxy group-containing polymer, and the like. If the average particle size of the polyvalent metal-containing particles is excessively small, ion cross-linking reaction with the carboxy group-containing polymer may progress at an earlier stage. Furthermore, if the particles are ultrafine particles with a particle size of less than 10 nm, it may be difficult to uniformly disperse them in the coating liquid.

In the case of a dry solid sample, the average particle size of the polyvalent metal-containing particles can be measured by measuring and counting the particles using a scanning electron microscope or transmission electron microscope. The average particle size of the polyvalent metal-containing particles in the coating liquid can be measured using a light scattering method [cf. "Engineering system for fine particles", pp. 362-365, Vol. 1, Fuji Technosystem (2001)]

The polyvalent metal-containing particles in the coating liquid are in the form of primary particles, secondary particles, or particles in which these particles are mixed; however, in many cases, they are assumed to be present in the form of secondary particles considering the average particle size.

Surfactant (C)

The above coating liquid uses a surfactant to enhance dispersion of the polyvalent metal-containing particles. Surfactants are compounds having both of hydrophilic and lipophilic groups per molecule. Surfactants include anionic, cationic, and amphoteric ionic surfactants, and nonionic surfactants. Any of these surfactants may be used in the above coating liquid.

The anionic surfactants may include, for example, carboxylic acid type anionic surfactants, sulfonic acid type anionic surfactants, sulfate ester type anionic surfactants, or phosphoric acid ester type anionic surfactants. Examples of the carboxylic acid type anionic surfactants may be aliphatic monocarboxylates, polyoxyethylene alkyl ether carboxylates, N-acyl sarcosinates, and N-acyl glutamates. Examples the sulfonic acid type anionic surfactants may be dialkyl sulfosuccinates, alkane sulfonates, alpha olefin sulfonates, linear alkyl benzene sulfonates, alkyl (branched chain) benzene sulfonates, naphthalene sulfonate-formaldehyde condensates, alkyl naphthalene sulfonates, and N-methyl-N-acyl taurates. Examples of the sulfate ester type anionic surfactants may be alkyl sulfates, polyoxyethylene alkyl ether sulfates, and oil sulfate ester salts. Examples of the phosphoric acid ester type anionic surfactants may be alkyl phosphate type anionic surfactants, polyoxyethylene alkyl ether phosphates, and polyoxyethylene alkyl phenyl ether phosphates.

The cationic surfactants may include, for example, alkylamine salt type cationic surfactants and quaternary ammonium salt type cationic surfactants. Examples of the alkylamine salt type cationic surfactant may be monoalkylamine salts, dialkylamine salts, and trialkylamine salts. Examples of the quaternary ammonium salt type cationic surfactants may be alkyl trimethyl ammonium halides (chloride, bromide, or iodide), and alkylbenzalkonium chlorides.

The amphoteric surfactants may include, for example, carboxybetaine type amphoteric surfactants, 2-alkylimidazoline derivative type amphoteric surfactants, glycine type amphoteric surfactants, and amine oxide type amphoteric surfactants. Examples of the carboxybetaine type amphoteric surfactants may be alkyl betaines and fatty acid amide propyl betaines. Examples of the 2-alkylimidazoline derivative type amphoteric surfactants may be 2-alkyl-N-carboxymethyl-N-hydroxyethyl imidazolinium betaines. Examples of the glycine type amphoteric surfactants may be alkyls or dialkyldiethylenetriaminoacetic acids. Examples of the amine oxide type amphoteric surfactants may be alkyl amine oxides.

The nonionic surfactants may include, for example, ester type nonionic surfactants, ether type nonionic surfactants, ester ether type nonionic surfactants, and alkanolamide type nonionic surfactants. Examples of the ester type nonionic surfactants may be glycerin fatty acid esters, sorbitan fatty acid esters, and sucrose fatty acid esters. Examples of the ether type nonionic surfactants may be polyoxyethylene alkyl ethers, polyoxyethylene alkyl phenyl ethers, and polyoxyethylene polyoxypropylene glycols. Examples of the ester ether type nonionic surfactants may be fatty acid polyethylene glycols and fatty acid polyoxyethylene sorbitans. Examples of the alkanolamide type nonionic surfactants may be fatty acid alkanolamides.

Surfactants having a polymer backbone, such as a styrene-acrylic acid copolymer, can also be used.

Of these surfactants, anionic surfactants such as of phosphate ester, surfactants having a polymer backbone such as a styrene-acrylic acid copolymer, and the like are preferred.

Organic Solvent (D)

The above coating liquid uses an organic solvent as a solvent or a disperse medium. As the organic solvent, a polar organic solvent that dissolves carboxy group-containing polymers is generally used; however, an organic solvent having no polar group (heteroatoms or atomic group having heteroatoms) may be used in combination with the polar organic solvent.

Examples of the organic solvent preferred to be used may include alcohols such as methanol, ethanol, isopropanol, n-propanol, and n-butanol; and polar organic solvents such as dimethyl sulfoxide, N,N-dimethylacetamide, N,N-dimethylformamide, N-methyl-2-pyrrolidone, tetramethylurea, hexamethylphosphoric acid triamide, and γ-butyrolactone.

Other than the above polar organic solvents, hydrocarbons such as benzene, toluene, xylene, hexane, heptane, and octane; ketones such as acetone and methyl ethyl ketone; halogenated hydrocarbons such as dichloromethane; esters such as methyl acetate; and ethers such as diethyl ether may be used as appropriate. Hydrocarbons, such as benzene, having no polar group are generally used in combination with polar organic solvents.

The coating liquid may contain only an organic solvent as a solvent or a disperse medium, but may further contain water. With water being contained in the coating liquid, solubility of the carboxy group-containing polymer can be improved, and coating performance of the coating liquid and workability can also be improved. The coating liquid may have a water content of 100 ppm or more, preferably 1,000 ppm or more, more preferably 1,500 ppm or more, and even more preferably 2,000 ppm or more, in terms of mass fraction.

The coating liquid, which uses a carboxy group-containing polymer whose number average molecular weight is low, is unlikely to produce a precipitate or a gel even with the water content that would have produced a precipitate or a gel in a coating liquid using a carboxy group-containing polymer whose number average molecular weight is high. The coating liquid is preferred to have a water content of 50,000 ppm or less, more preferably 30,000 ppm or less, even more preferably 10,000 ppm or less, and most preferably 5,000 ppm or less, in terms of mass fraction.

Composition

The coating liquid, which contains the carboxy group-containing polymer (A), polyvalent metal-containing particles (B), surfactant (C), and organic solvent (D), is a dispersion liquid, with the polyvalent metal-containing particles dispersed therein.

The ratio of the product (Bt) of the mole number and the valence of the polyvalent metal contained in the polyvalent metal-containing particles (B), to the mole number (At) of the carboxy groups contained in the carboxy group-containing polymer (A) (also termed equivalent ratio hereinafter) is preferred to be 0.6 or more. The ratio is more preferred to be 0.8 or more, and most preferred to be 1.0 or more. The upper limit of the ratio is usually 10.0, but is preferred to be 2.0. If the ratio is excessively small, the laminate, in which the coating layer is formed from the coating liquid, may be deteriorated in various properties such as gas barrier properties, hot water resistance, and water vapor resistance.

The equivalent ratio can be calculated as follows, for example. The following description will be given, taking an example in which the carboxy group-containing polymer is polyacrylic acid and the polyvalent metal compound is magnesium oxide.

Polyacrylic acid has a molecular weight of 72 in a monomer unit, and has one carboxy group per monomer molecule. Therefore, the amount of carboxy groups in 100 g of polyacrylic acid is 1.39 mol. The equivalent ratio being 1.0 in the coating liquid containing 100 g of polyacrylic acid means that the coating liquid contains magnesium oxide with an amount that can neutralize 1.39 mol of carboxy groups. Accordingly, in order to achieve the equivalent ratio of 0.6 in the coating liquid containing 100 g of polyacrylic acid, magnesium oxide with an amount that can neutralize 0.834 mol of carboxy groups may need to be added to the coating liquid. The valence of magnesium is divalent, while the molecular weight of magnesium oxide is 40. Accordingly, in order to achieve the equivalent ratio of 0.6 in the coating liquid containing 100 g of polyacrylic acid, 16.68 g (0.417 mol) of magnesium oxide may need to be added to the coating liquid.

The organic solvent is used with an amount that is sufficient for the carboxy group-containing polymer to uniformly dissolve therein and for the polyvalent metal-containing particles to uniformly disperse therein. Accordingly, the organic solvent used is one that can dissolve the carboxy group-containing polymer, without substantially dissolving the polyvalent metal compound, but can disperse the latter in the form of particles.

The surfactant is used with an amount sufficient for the polyvalent metal-containing particles to stably disperse. The concentration of the surfactant in the coating liquid is usually 0.0001 mass % to 70 mass %, preferably 0.001 mass % to 60 mass %, and more preferably 0.1 mass % to 50 mass %.

If no surfactant is added, it may be difficult to disperse the polyvalent metal-containing particles in the coating liquid so that their average particle size would be sufficiently small. Consequently, it will be difficult to obtain a coating liquid in which the polyvalent metal-containing particles are uniformly dispersed and thus it will be difficult to form a coating film having a uniform thickness.

Method of Producing Coating Liquid

In order to produce a coating liquid, a carboxy group-containing polymer solution in which the carboxy group-containing polymer (A) is uniformly dissolved in the organic solvent (D) is prepared, on the one hand. For example, if commercially available polyacrylic acid is used as a starting material, the polyacrylic acid is uniformly dissolved in the organic solvent (D) to prepare a polyacrylic acid solution.

Then, on the other hand, the polyvalent metal-containing particles (B), the surfactant (C), and the organic solvent (D) are mixed with each other and the mixture is subjected to dispersion treatment, as necessary, to prepare a dispersion liquid. The dispersion treatment is performed so that the polyvalent metal-containing particles (B) will have a predetermined average particle size. If the average particle size of the polyvalent metal-containing particles (B) in the mixture is 10 μm or less before dispersion treatment, dispersion treatment may be omitted; however, it is still preferred to perform dispersion treatment even in this case. If dispersion treatment is performed, cohesion of the polyvalent metal-containing particles (B) may be loosened and the coating liquid is stabilized, while transparency of the gas barrier laminate obtained by applying the coating liquid may be enhanced. Furthermore, when applying the coating liquid and drying the coating film, cross-linking between the carboxy group-containing polymer and the polyvalent metal ions may easily progress, and a gas barrier laminate having high gas barrier properties may be easily obtained.

The method of dispersion treatment may be a method using a high-speed agitator, homogenizer, ball mill or bead mill. In particular, if a ball mill or a bead mill is used, the mixture can be dispersed with high efficiency, and therefore, a coating liquid in which the dispersion is stable can be obtained in a comparatively short time. In this case, the diameter of each ball or bead is preferred to be small, i.e., preferred to be 0.1 mm to 1 mm.

The carboxy group-containing polymer solution and the polyvalent metal-containing particles prepared as described above are mixed with each other to thereby produce a coating liquid.

In the coating liquid, the total concentration of the components other than the organic solvent is preferred to be in the range of 0.1 mass % to 60 mass %, more preferred to be in the range of 0.5 mass % to 25 mass %, and most preferred to be in the range of 1 mass % to 10 mass %, from the perspective of achieving a desired thickness in coating film and obtaining a coating layer with high workability.

As necessary, various additives may be added to the coating liquid. These additives may include other polymers, a thickener, stabilizer, UV absorber, antiblocking agent, softener, inorganic lamellar compound (e.g., montmorillonite), colorant (die or pigment), and the like.

As described above, the carboxy group-containing polymer used for preparing the coating liquid has a low number average molecular weight. The coating liquid obtained using such a carboxy group-containing polymer can produce a gas barrier laminate achieving high gas barrier properties, even in the case where the coating liquid is prepared without strict control for preventing entry of moisture.

Gas Barrier Laminate

A gas barrier laminate according to an embodiment of the present invention is characterized in that the gas barrier laminate includes a substrate and a gas barrier layer provided on at least one surface of the substrate. In the gas barrier laminate, the gas barrier layer includes a coating layer formed from the above coating liquid.

Substrate

The substrate of the gas barrier laminate is not particularly limited, but various types of substrates can be used.

The materials forming the substrate are not particularly limited, but various types of materials can be used, including, for example, plastics or paper.

The substrate may have a single layer structure made of one material, or may have a multilayer structure made of multiple materials. The substrate with a multilayer structure may include, for example, a substrate in which a film made of a plastic is laminated on paper.

Of the above materials, the material forming the substrate is preferred to be a plastic, from the perspective that it can be formed into various shapes and can further expand application with gas barrier properties imparted thereto.

Examples of the plastic may include, but are not particularly limited to, polyolefin resins such as polyethylene and polypropylene; polyester resins such as polyethylene terephthalate, polyethylene-2,6-naphthalate, polybutylene terephthalate, and copolymers thereof; polyamide resins such as nylon 6, nylon 66, nylon 12, metaxylylene adipamide, and copolymers thereof; styrene resins such as polystyrene, styrene-butadiene copolymers, and styrene-butadiene-acrylonitrile copolymers; poly(meth)acrylic acid esters; polyacrylonitriles; polyvinyl acetate; ethylene-vinyl acetate copolymers; ethylene-vinyl alcohol copolymers; polycarbonates; polyarylates; regenerated celluloses; polyimides; polyetherimides; polysulfones; polyethersulfones; polyetherketones; and ionomer resins.

In the case of using the gas barrier laminate in food packaging materials, the substrate is preferred to be made of polyethylene, polypropylene, polyethylene terephthalate, nylon 6 or nylon 66.

The plastics for forming the substrate may be used singly or may be used by mixing two or more of them with each other.

Additives may be formulated into the plastics. Depending on use, additives can be appropriately selected from known additives such as pigments, antioxidants, antistatic agents, UV absorbers, and lubricants. The additives may be used singly or in combination of two or more.

The form of the substrate is not particularly limited but may be in the form of, for example, a film, sheet, cup, tray, tube, and bottle. Of these forms, films are preferred.

If the substrate is a film, the film may be a stretched film, or may be an unstretched film.

The thickness of the film is not particularly limited but is preferred to be in the range of 1 μm to 200 μm, and more preferred to be in the range of 5 μm to 100 μm, from the perspective of physical strength of the gas barrier laminate to be obtained and processing suitability.

The surface of the substrate may be subjected to plasma treatment, corona treatment, ozone treatment, flame treatment, radical activation treatment with UV or electron beams, or the like, in order that the coating liquid can be applied onto the substrate without being repelled. The treatment method is appropriately selected, depending on the substrate type.

Coating Layer

The coating layer is formed of the above coating liquid. Specifically, the coating layer is obtained by applying the above coating liquid onto a substrate, and drying the coating. As described above, the coating layer contains a carboxy group-containing polymer which is ion-crosslinked by polyvalent metal ions, and exhibits good gas barrier properties even in high humidity atmospheres.

The coating layer may be provided to one surface or both surfaces of the substrate.

The coating layer may be directly provided to the surface (s) of the substrate, or may be provided to a surface of one or more other layers (e.g., an anchor layer) formed on the substrate.

Details of the method of forming the coating layer will be described later.

The thickness of the coating layer is preferred to be in the range of 0.01 μm to 100 μm, more preferred to be in the range of 0.1 μm to 10 μm, and even more preferred to be in the range of 0.1 μm to 0.5 μm, from the perspective of formability and handleability of the gas barrier laminate when formed, but it is not particularly limited thereto.

Other Layers

As necessary, the gas barrier laminate described above may further include one or more layers other than the substrate and the coating layer.

For example, the gas barrier layer of the gas barrier laminate may be formed of only a coating layer, but may further include one or more layers in addition to the coating layer. For example, a layer formed of an inorganic compound such as aluminum oxide, silicon oxide, or aluminum may be formed on the surface of the substrate using sputtering, ion plating, or the like.

The gas barrier laminate may further include an anchor coat layer between the substrate and the coating layer, for the purposes of enhancing adhesion between the substrate and the coating layer and applying the coating liquid onto the substrate without being repelled.

The anchor coat layer can be formed using a known anchor coat agent through an ordinarily used method.

Examples of the anchor coat agent may include those which contain a resin such as a polyurethane resin, acrylic resin, melamine resin, polyester resin, phenol resin, amino resin, or fluorine resin.

The anchor coat agent may further contain an isocyanate compound in addition to the resin, for the purpose of enhancing adhesion or hot water resistance. The isocyanate compound may only need to have one or more isocyanate groups per molecule, which may be, for example, hexamethylene diisocyanate, xylylene diisocyanate, isophorone diisocyanate, or tolylene diisocyanate.

The anchor coat agent may further contain a liquid medium for dissolving or dispersing the resin or the isocyanate compound.

The thickness of the anchor coat layer is not particularly limited.

As necessary, the gas barrier laminate may further include a second layer laminated via an adhesive or a second layer formed by extruding an adhesive resin, on the coating layer provided on the substrate or on the surface of the substrate not provided with a coating layer.

The second layer to be laminated may be selected as appropriate according to purposes such as of imparting strength, sealability, easy-to-open properties after sealed, good appearance, light shielding property, moisture-proof property, and the like, to the laminate, and may be made of a material, for example, similar to the plastics mentioned above for the substrate, but it is not limited thereto. Other than these materials, paper, aluminum foil, and the like may be used.

The thickness of the second layer to be laminated is preferred to be in the range of 1 μm to 1,000 μm, more preferred to be in the range of 5 μm to 500 μm, even more preferred to be in the range of 5 μm to 200 μm, and most preferred to be in the range of 5 μm to 150 μm.

The second layer to be laminated may be formed of a single layer or may be formed of two or more layers.

As necessary, the gas barrier laminate may further include a printed layer. The printed layer may be formed on the coating layer which is provided on the substrate, or may be formed on the surface of the substrate not provided with a coating layer. If the second layer has been laminated, the printed layer may be formed on the laminated second layer.

Method of Producing Gas Barrier Laminate

The gas barrier laminate can be produced using a method which includes a step of forming a coating layer by applying a coating liquid onto a substrate and drying the coating. As necessary, this production method may further include a step of laminating a second layer and a step of forming a printed layer before/after the step of forming a coating layer.

Examples of the method of applying the coating liquid may include, but are not particularly limited thereto, air knife coating, direct gravure coating, gravure offset, arc gravure coating, reverse roll coating such as top-feed reverse coating, bottom-feed reverse coating or nozzle-feed reverse coating, five-roll coating, lip coating, bar coating, bar reverse coating, and die coating.

Examples of the drying method may include, but are not particularly limited to, a natural drying method, a method using an oven set to a predetermined temperature, and a method using a drying machine, such as an arch dryer, floating dryer, drum dryer, or infrared dryer, attached to a coater.

Drying conditions can be selected as appropriate, depending on the drying method and the like. For example, in the drying method using an oven, the drying temperature is preferred to be in the range of 40° C. to 150° C., more preferred to be in the range of 45° C. to 150° C., and most preferred to be in the range of 50° C. to 140° C. Duration of drying depends on the drying temperature, but is preferred to be in the range of 0.5 sec to 10 min, more preferred to be in the range of 1 sec to 5 min, and most preferred to be in the range of 1 sec to 1 min.

It is assumed that, during or after drying, the carboxy group-containing polymer reacts with the polyvalent metal-containing particles to introduce an ion cross-linked structure. In order to sufficiently progress the ion cross-linking reaction, the film after being dried is preferred to be aged for about 1 sec to 10 days in atmospheres with a relative humidity of 20% or more, and more preferably in the range of 40% to 100%, under temperature conditions of preferably 5° C. to 200° C., and more preferably in the range of 20° C. to 150° C.

Since the gas barrier laminate obtained in this way is ion cross-linked, it exhibits high resistance to moisture, water, hot water, and water vapor. Furthermore, such a gas barrier laminate exhibits high gas barrier properties not only under low moisture conditions but also under high moisture conditions. Such a gas barrier laminate is preferred to have an oxygen permeability of 1,000 $cm^3/(m^2 \cdot day \cdot MPa)$ or less, more preferably 500 $cm^3/(m^2 \cdot day \cdot MPa)$ or less, and most preferably 100 $cm^3/(m^2 \cdot day \cdot MPa)$ or less measured under conditions of 30° C. and relative humidity of 70% according to JIS K-7126 B (equal-pressure method) and the method described in ASTM D3985. The lower the oxygen permeability is, the more preferred it is. The lower limit of the oxygen permeability is usually 0.1 $cm^3/(m^2 \cdot day \cdot MPa)$ or more, but it is not particularly limited thereto.

As described above, the carboxy group-containing polymer contained in the coating liquid has a low number average molecular weight. Such a coating liquid can produce a gas barrier laminate achieving high gas barrier properties, even in the case where the coating liquid is stored and used without strict control for preventing entry of moisture.

Packaging Material, Packaging Body, and Packaged Article

A packaging material according to an embodiment of the present invention includes the gas barrier laminate described above. The packaging material may be used, for example, for producing packaging bodies which are used for wrapping articles.

A packaging body according to an embodiment of the present invention contains the packaging material described above.

The packaging body may be made of the above packaging material, or may contain the above packaging material and include other members. In the case of the former, the packaging body may be, for example, a body shaped into a bag. In the case of the latter, the packaging body may be, for example, a container including a cap made of the above packaging material and a bottomed cylindrical container body.

In the packaging body, the packaging material may be a molded article. As mentioned above, the molded article may be a container such as a bag, or may be a part, such as a cap, of a container. The packaging body or a part thereof may specifically be, for example, a packaging bag, spouted pouch, laminate tube, infusion bag, container cap, or paper container.

There is no particular limitation in usage to which the packaging body is applied. The packaging body can be used for wrapping various articles.

A packaged article according to an embodiment of the present invention includes the packaging body described above and contents therein.

As described above, the gas barrier laminate has good gas barrier properties. Therefore, the packaging material and the packaging body including the gas barrier laminate can be preferably used as a packaging material and a packaging body for articles which are easily deteriorated due to oxygen, water vapor, and the like, and can be most preferably used as a food packaging material and a food packaging body. The packaging material and the packaging body can also be preferably used as a packaging material and a packaging body for wrapping chemicals such as pesticides and medicines, medical tools, machine parts, and industrial materials such as precision materials.

When the gas barrier laminate is subjected to heat sterilization treatment such as boiling treatment and retort treatment, gas barrier properties and interlayer adhesion tend not to be deteriorated but tend to be enhanced instead. Accordingly, the packaging material and the packaging body may be a heat sterilizable packaging material and a heat sterilizable packaging body.

The heat sterilizable packaging material and the heat sterilizable packaging body are used for wrapping articles which are heat sterilized after being packaged.

The articles which are heat sterilized after being packaged may be, for example, food such as curry, stew, soup, sauce, and processed meat.

Heat sterilization treatment may be, for example, boiling treatment and retort treatment.

Boiling treatment is a treatment in which food and the like are moist-heat sterilized for preservation. In boiling treatment, packaged articles, each including contents such as food wrapped with the packaging body, are usually moist-heat sterilized at a temperature of 60° C. to 100° C. for 10 min to 120 min under atmospheric pressure, although they depend on the contents. Usually, boiling treatment is performed using a hot-water tank. Boiling treatment includes batch treatment in which packaged articles are immersed in constant-temperature hot water in a tank and taken out after the lapse of a given time, and continuous treatment in which packaged articles are passed through a hot water tank tunnel for sterilization.

Retort treatment is a treatment in which microorganisms such as mold, yeast, and bacteria are heat sterilized under pressure for preservation of food or the like in general. In retort treatment, usually, packaged articles, each including food wrapped with the packaging body, are pressure heat-sterilized at a temperature of 105° C. to 140° C. for 10 min to 120 min under pressure of 0.15 MPa to 0.3 MPa. Retort devices include steam devices using heated steam and hot water devices using pressurized superheated water. These devices are used as appropriate according to sterilization conditions of the food or the like to be contained.

EXAMPLES

Specific examples of the present invention will be described below.

Example 1A

The carboxy group-containing polymer (A) was heated and dissolved in 2-propanol. As the carboxy group-containing polymer (A), polyacrylic acid (with a number average molecular weight of 5,000, manufactured by Wako Pure Chemical Corporation) was used. In this way, a polyacrylic acid solution containing polyacrylic acid with a concentration of 10 mass % was prepared.

1.8 g of polyether phosphate ester (DISPARLON (trademark) DA-325 with a solid content of 100 mass %, manufactured by Kusumoto Chemicals, Ltd.) was dissolved in 26.2 g of 2-propanol. Then, zinc oxide (FINEX (trademark)-30, manufactured by Sakai Chemical Industry Co., Ltd.) with an average primary particle size of 35 nm was added to the solution and stirred. The obtained liquid was subjected to dispersion treatment for 1 hour using a planetary ball mill (P-7 manufactured by Fritsch Co., Ltd.). For this dispersion treatment, zirconium beads with a diameter of 0.2 mm were used. After that, the beads were sieved and separated from the liquid to obtain a dispersion liquid containing zinc oxide with a concentration of 30 mass %.

Next, 5.2 g of the polyacrylic acid solution, 1.9 g of the zinc oxide dispersion liquid, and 1.0 g of the 2-propanol were mixed with each other to prepare a coating liquid 1A. In the coating liquid 1A, the ratio, i.e., the equivalent ratio, of the product of the mole number and the valence of zinc, to the mole number of the carboxy groups contained in the polyacrylic acid was 1.0.

The coating liquid 1A was applied to one surface of a biaxially stretched polyethylene terephthalate film (Lumirror (trademark) P60 with a thickness of 12 manufactured by Toray Advanced Film Co., Ltd.), using a bar coater (ROD No. 8 with a wet thickness of 20 manufactured by Yasuda Seiki Seisakusho, Ltd.). The coating film was dried in an oven set to a temperature of 50° C. for 1 minute to form a coating layer. In this way, a laminate 1A was obtained.

Next, an unstretched polypropylene film (ZK93-FM with a thickness of 60 manufactured by Toray Advanced Film Co., Ltd.) was dry-laminated onto the coating layer-side surface of the laminate 1A via a two-pack polyurethane-based adhesive (TAKELAC A-525/TAKENATE A-52 manufactured by Mitsui Chemicals, Inc.), and aged at 40° C. for 3 days, thereby obtaining a laminate film 1A.

Example 2A

A coating liquid 2A was prepared as in the method described above for the coating liquid 1A, except that polyacrylic acid (AC-10LP manufactured by Toagosei Co., Ltd.) with a number average molecular weight of 50,000 was used as the carboxy group-containing polymer (A) instead of the polyacrylic acid with a number average molecular weight of 5,000. A laminate 2A was obtained as in the method described above for the laminate 1A, except that the coating liquid 2A was used instead of the coating liquid 1A. A laminate film 2A was obtained as in Example 1A, except that the laminate 2A was used instead of the laminate 1A.

Example 3A

A coating liquid 3A was prepared as in the method described above for the coating liquid 1A, except that polyacrylic acid (AC-10LHP manufactured by Toagosei Co., Ltd.) with a number average molecular weight of 250,000 was used as the carboxy group-containing polymer (A) instead of the polyacrylic acid with a number average molecular weight of 5,000. A laminate 3A was obtained as in the method described above for the laminate 1A, except that the coating liquid 3A was used instead of the coating liquid 1A. A laminate film 3A was obtained as in Example 1A, except that the laminate 3A was used instead of the laminate 1A.

Example 4A

A coating liquid 4A was prepared as in the method described above for the coating liquid 1A, except that polyacrylic acid (manufactured by Sigma-Aldrich Co. LLC) with a number average molecular weight of 450,000 was used as the carboxy group-containing polymer (A) instead of the polyacrylic acid with a number average molecular weight of 5,000. A laminate 4A was obtained as in the method described above for the laminate 1A, except that the coating liquid 4A was used instead of the coating liquid 1A. A laminate film 4A was obtained as in Example 1A, except that the laminate 4A was used instead of the laminate 1A.

Example 5A

A coating liquid 5A was prepared as in the method described above for the coating liquid 1A, except that polyacrylic acid (manufactured by Wako Pure Chemical Corporation) with a number average molecular weight of 1,000,000 was used as the carboxy group-containing polymer (A) instead of the polyacrylic acid with a number average molecular weight of 5,000. A laminate 5A was obtained as in the method described above for the laminate 1A, except that the coating liquid 5A was used instead of the coating liquid 1A. A laminate film 5A was obtained as in Example 1A, except that the laminate 5A was used instead of the laminate 1A.

Example 6A

A coating liquid 6A was prepared as in the method described above for the coating liquid 1A, except that polyacrylic acid (manufactured by Sigma-Aldrich Co. LLC) with a number average molecular weight of 4,000,000 was used as the carboxy group-containing polymer (A) instead of the polyacrylic acid with a number average molecular weight of 5,000. A laminate 6A was obtained as in the method described above for the laminate 1A, except that the coating liquid 6A was used instead of the coating liquid 1A. A laminate film 6A was obtained as in Example 1A, except that the laminate 6A was used instead of the laminate 1A.

(Evaluations)

(1) Stability of Coating Liquid

The coating liquids 1A to 6A were visually observed immediately after they were prepared and after the lapse of 1 day, and evaluated according to the following criteria. The results are shown in Table 1 together with the compositions of the coating liquids. It should be noted that, in Table 1, the term water content refers to the water content of the coating liquids immediately after preparation.

A: No precipitation had occurred after the lapse of 1 day

B: No precipitation occurred immediately after preparation but precipitation had occurred after the lapse of 1 day C: Precipitation occurred immediately after preparation

(2) Oxygen Permeability of Laminate Film

Each obtained laminate film was cut to 2 sheets each with a size of 20 cm×15 cm and these sheets were overlapped with each other so that the unstretched polypropylene film surfaces face each other, in the state of which three sides of the overlapped sheets were sealed to produce a pouch. After injecting 200 mL of water into the pouch, the remaining 1 side was sealed.

The obtained water-filled pouch was subjected to retort treatment at 121° C. for 30 minutes using a retort treatment machine (RCS-60 manufactured by Hisaka Works, Ltd.).

After the retort treatment, the water was removed and the oxygen permeability of each of the laminate films 1A to 6A was measured using the following procedure.

Specifically, the oxygen permeability of each laminate was measured using an oxygen permeation tester OXTRAN (trademark) 2/20 manufactured by Modern Control Inc., under conditions of 30° C. and a relative humidity of 70%. The measurement method was based on JIS K-7126 B (equal-pressure method) and ASTM D3985, and the measured values were expressed in a unit of $cm^3/(m^2 \cdot day \cdot MPa)$. The results are shown in Table 1.

TABLE 1

| | | 1A | 2A | 3A | 4A | 5A | 6A |
|---|---|---|---|---|---|---|---|
| Carboxy group-containing polymer | Type | Polyacrylic acid | Polyacrylic acid | Polyacrylic acid | Polyacrylic acid | Polyacrylic acid | Polyacrylic acid |
| | Molecular weight | 5,000 | 50,000 | 250,000 | 450,000 | 1,000,000 | 4,000,000 |
| | Amount (mass %) | 6.4 | 6.4 | 6.4 | 6.4 | 6.4 | 6.4 |
| Polyvalent metal-containing particles | Type | Zinc oxide | Zinc oxide | Zinc oxide | Zinc oxide | Zinc oxide | Zinc oxide |
| | Amount (mass %) | 3.7 | 3.7 | 3.7 | 3.7 | 3.7 | 3.7 |
| Surfactant | Type | Polyether phosphate ester | Polyether phosphate ester | Polyether phosphate ester | Polyether phosphate ester | Polyether phosphate ester | Polyether phosphate ester |
| | Amount (mass %) | 0.6 | 0.6 | 0.6 | 0.6 | 0.6 | 0.6 |
| Organic solvent | Type | 2-propanol | 2-propanol | 2-propanol | 2-propanol | 2-propanol | 2-propanol |
| | Amount (mass %) | 89.3 | 89.3 | 89.3 | 89.3 | 89.3 | 89.3 |
| Water content [ppm] | | 1,000 | 1,000 | 1,000 | 1,000 | 1,000 | 1,000 |
| Film formability | | Formable | Formable | Formable | Formable | Formable | Formable |
| Oxygen permeability [cm$^3$/(m$^2$ · day · MPa)] | | 10 | 10 | 10 | 100 | 1,000 | 1,500 |

As shown in Table 1, the coating liquids 1A and 2A exhibited high stability. Also, the laminates 1A and 2A obtained using the coating liquids 1A and 2A exhibited low oxygen permeability and high gas barrier properties, compared to the laminates 3A to 6A.

(3) Stability of Water-Added Coating Liquid

Water was added to the coating liquids 1A to 6A so that the water mass fraction would be 30,000 ppm to prepare respective coating liquids 1B to 6B. Then, the coating liquids were visually observed immediately after addition of water and after the lapse of 1 day, and evaluated according C: Precipitation or gelling occurred immediately after addition of water (4) Oxygen Permeability of Laminate Film Including Laminate Prepared Using Water-Added Coating Liquid Laminate films 1B and 2B were obtained as in the method described for the laminate film 1A, except that the coating liquids 1B and 2B were used instead of the coating liquid 1A. Then, oxygen permeability of the laminate films 1B and 2B was measured using a procedure similar to one described above. The results are shown in Table 2.

TABLE 2

| | | 1B | 2B | 3B | 4B | 5B | 6B |
|---|---|---|---|---|---|---|---|
| Carboxy group-containing polymer | Type | Polyacrylic acid | Polyacrylic acid | Polyacrylic acid | Polyacrylic acid | Polyacrylic acid | Polyacrylic acid |
| | Molecular weight | 5,000 | 50,000 | 250,000 | 450,000 | 1,000,000 | 4,000,000 |
| | Amount (mass %) | 6.4 | 6.4 | 6.4 | 6.4 | 6.4 | 6.4 |
| Polyvalent metal-particles containing | Type | Zinc oxide | Zinc oxide | Zinc oxide | Zinc oxide | Zinc oxide | Zinc oxide |
| | Amount (mass %) | 3.7 | 3.7 | 3.7 | 3.7 | 3.7 | 3.7 |
| Surfactant | Type | Polyether phosphate ester | Polyether phosphate ester | Polyether phosphate ester | Polyether phosphate ester | Polyether phosphate ester | Polyether phosphate ester |
| | Amount (mass %) | 0.6 | 0.6 | 0.6 | 0.6 | 0.6 | 0.6 |
| Organic solvent | Type | 2-propanol | 2-propanol | 2-propanol | 2-propanol | 2-propanol | 2-propanol |
| | Amount (mass %) | 89.3 | 89.3 | 89.3 | 89.3 | 89.3 | 89.3 |
| Water content [ppm] | | 30,000 | 30,000 | 30,000 | 30,000 | 30,000 | 30,000 |
| Film formability | | Formable | Formable | Not formable | Not formable | Not formable | Not formable |
| Oxygen permeability [cm$^3$/(m$^2$ · day · MPa)] | | 10 | 10 | — | — | — | — | to the following criteria. The results are shown in Table 2 together with the compositions of the coating liquids. It should be noted that, in Table 2, the term water content refers to the water content of the coating liquids immediately after addition of water.

A: No precipitation had occurred after the lapse of 1 day

B: No precipitation occurred immediately after addition of water but precipitation or gelling had occurred after the lapse of 1 day As shown in Table 2, the coating liquids 1B and 2B exhibited high stability. Also, the laminates 1B and 2B obtained using the coating liquids 1B and 2B exhibited low oxygen permeability and high gas barrier properties. In contrast, it was difficult to form films using the coating liquids 3B to 6B due to gelling immediately after addition of water.

(5) Oxygen Permeability of Laminate Film Including Laminate Prepared Using Water-Added Coating Liquid and Polypropylene Film as Substrate Laminate films 1C and 2C were obtained as in the method described for the laminate film 1A, except that the coating liquids 1B and 2B were used instead of the coating liquid 1A and a biaxially stretched polypropylene film (ME-1 (product name) with a thickness of manufactured by Mitsui Chemicals Tohcello, Inc.) was used as a substrate instead of using the biaxially stretched polyethylene terephthalate film. Then, oxygen permeability of the laminate films 1C and 2C was measured using a procedure similar to one described above. The results are shown in Table 3.

TABLE 3

|  |  | 1C | 2C |
|---|---|---|---|
| Carboxy group-containing polymer | Type | Polyacrylic acid | Polyacrylic acid |
|  | Molecular weight | 5,000 | 50,000 |
|  | Amount (mass %) | 6.4 | 6.4 |
| Polyvalent metal-containing particles | Type | Zinc oxide | Zinc oxide |
|  | Amount (mass %) | 3.7 | 3.7 |
| Surfactant | Type | Polyether phosphate ester | Polyether phosphate ester |
|  | Amount (mass %) | 0.6 | 0.6 |
| Organic solvent | Type | 2-propanol | 2-propanol |
|  | Amount (mass %) | 89.3 | 89.3 |
| Water content [ppm] |  | 30,000 | 30,000 |
| Film formability |  | Formable | Formable |
| Oxygen permeability [cm$^3$/(m$^2$ · day · MPa] |  | 10 | 10 |

(6) Oxygen Permeability of Laminate Film Including Laminate Prepared Using Water-Added Coating Liquid and Polyethylene Film as Substrate Laminates 1D and 2D were obtained as in the method described for the laminate 1A, except that the coating liquids 1B and 2B were used instead of the coating liquid 1A and a high density polyethylene film (HD (product name) with a thickness of 40 manufactured by Tamapoly Co., Ltd.) was used as a substrate instead of using the biaxially stretched polyethylene terephthalate film.

Then, laminate films 1D and 2D were obtained as in the method described for the laminate film 1A, except that the laminates 1D and 2D were used instead of the laminate 1A and a linear low density polyethylene film was used instead of the unstretched polypropylene film.

Each obtained laminate film was cut to 2 sheets each with a size of 20 cm×15 cm and these sheets were overlapped with each other so that the unstretched polypropylene film surfaces face each other, in the state of which three sides of the overlapped sheets were sealed to produce a pouch. After injecting 200 mL of water into the pouch, the remaining 1 side was sealed to obtain a water-filled pouch.

The obtained water-filled pouch was subjected to boiling treatment at 90° C. for 30 minutes. Then, oxygen permeability of the laminate films 1D and 2D was measured using a procedure similar to one described above. The results are shown in Table 4.

TABLE 4

|  |  | 1D | 2D |
|---|---|---|---|
| Carboxy group-containing polymer | Type | Polyacrylic acid | Polyacrylic acid |
|  | Molecular weight | 5,000 | 50,000 |
|  | Amount (mass %) | 6.4 | 6.4 |
| Polyvalent metal-containing particles | Type | Zinc oxide | Zinc oxide |
|  | Amount (mass %) | 3.7 | 3.7 |
| Surfactant | Type | Polyether phosphate ester | Polyether phosphate ester |
|  | Amount (mass %) | 0.6 | 0.6 |
| Organic solvent | Type | 2-propanol | 2-propanol |
|  | Amount (mass %) | 89.3 | 89.3 |
| Water content [ppm] |  | 30,000 | 30,000 |
| Film formability |  | Formable | Formable |
| Oxygen permeability [cm$^3$/(m$^2$ · day · MPa] |  | 10 | 10 |

What is claimed is:

1. A coating liquid for producing a gas barrier laminate, wherein
the coating liquid contains a carboxy group-containing polymer (A), polyvalent metal-containing particles (B), a surfactant (C), and an organic solvent (D); and
the carboxy group-containing polymer (A) has a number average molecular weight of 100,000 or less, wherein the coating liquid has a water content of 1,500 ppm or more.

2. The coating liquid of claim 1, wherein the carboxy group-containing polymer (A) has a number average molecular weight of 2,000 or more.

3. The coating liquid of claim 1, wherein the coating liquid has a water content of 50,000 ppm or less in terms of mass fraction.

4. The coating liquid of claim 1, wherein a ratio of a product (Bt) of a mole number and a valence of polyvalent metal contained in the polyvalent metal-containing particles (B), to a mole number (At) of carboxy groups contained in the carboxy group-containing polymer (A) is 0.6 or more.

5. The coating liquid of claim 1, wherein the carboxy group-containing polymer (A) is a homopolymer of a carboxy group-containing unsaturated monomer, a copolymer of two or more carboxy group-containing unsaturated monomers, a copolymer of a carboxy group-containing unsaturated monomer and other polymerizable monomers, a carboxy group-containing polysaccharide, or a mixture of two or more of these materials.

6. The coating liquid of claim 1, wherein the carboxy group-containing unsaturated monomer forming the carboxy group-containing polymer (A) is at least one α,β-monoethylenically unsaturated carboxylic acid selected from a group consisting of acrylic acid, methacrylic acid, crotonic acid, itaconic acid, maleic acid, and fumaric acid.

7. The coating liquid of claim 1, wherein the polyvalent metal-containing particles (B) have an average particle size in a range of 10 nm to 10 μm.

8. The coating liquid of claim 1, wherein the polyvalent metal of the polyvalent metal-containing particles (B) is a bivalent metal.

9. A method of producing a gas barrier laminate comprising forming a coating layer using the coating liquid of claim 1.

10. A gas barrier laminate obtained using the production method of claim 9.

11. The gas barrier laminate of claim 10, wherein the laminate has a thickness in a range of 0.01 μm to 100 μm and an oxygen permeability of 1,000 cm3/(m2·day·MPa) or less measured under conditions of 30° C. and a relative humidity of 70%.

12. A packaging material including the gas barrier laminate of claim 10.

13. A packaging body containing the packaging material of claim 12.

14. A packaged article including
    the packaging body of claim 13; and
    contents accommodated in the packaging body.

15. The coating liquid of claim 1, wherein the coating liquid has the water content of 2000 ppm or more.

16. The coating liquid of claim 1, wherein the coating liquid has the water content of 2000 ppm or more and 30,000 ppm or less.

\* \* \* \* \*